Nov. 5, 1935.  K. F. SCHOEW  2,020,081
HYGROMETER
Original Filed Aug. 31, 1932   2 Sheets-Sheet 1
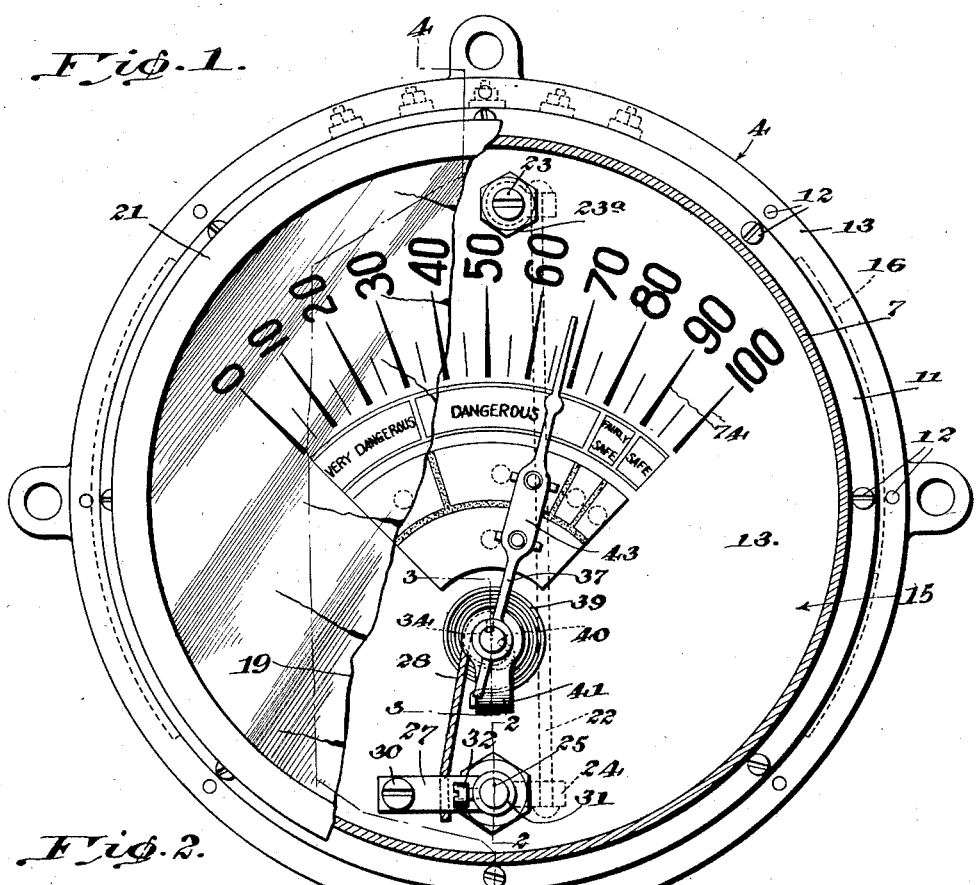
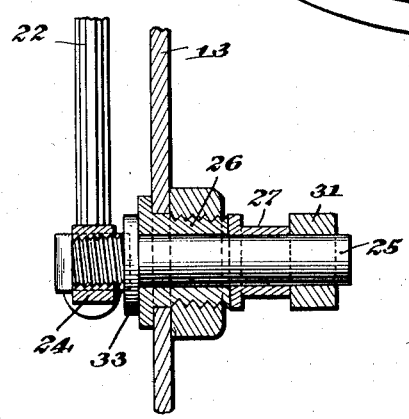
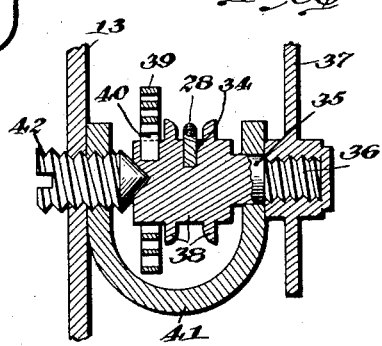
WITNESSES
INVENTOR
Karl F. Schoew,
BY
ATTORNEYS

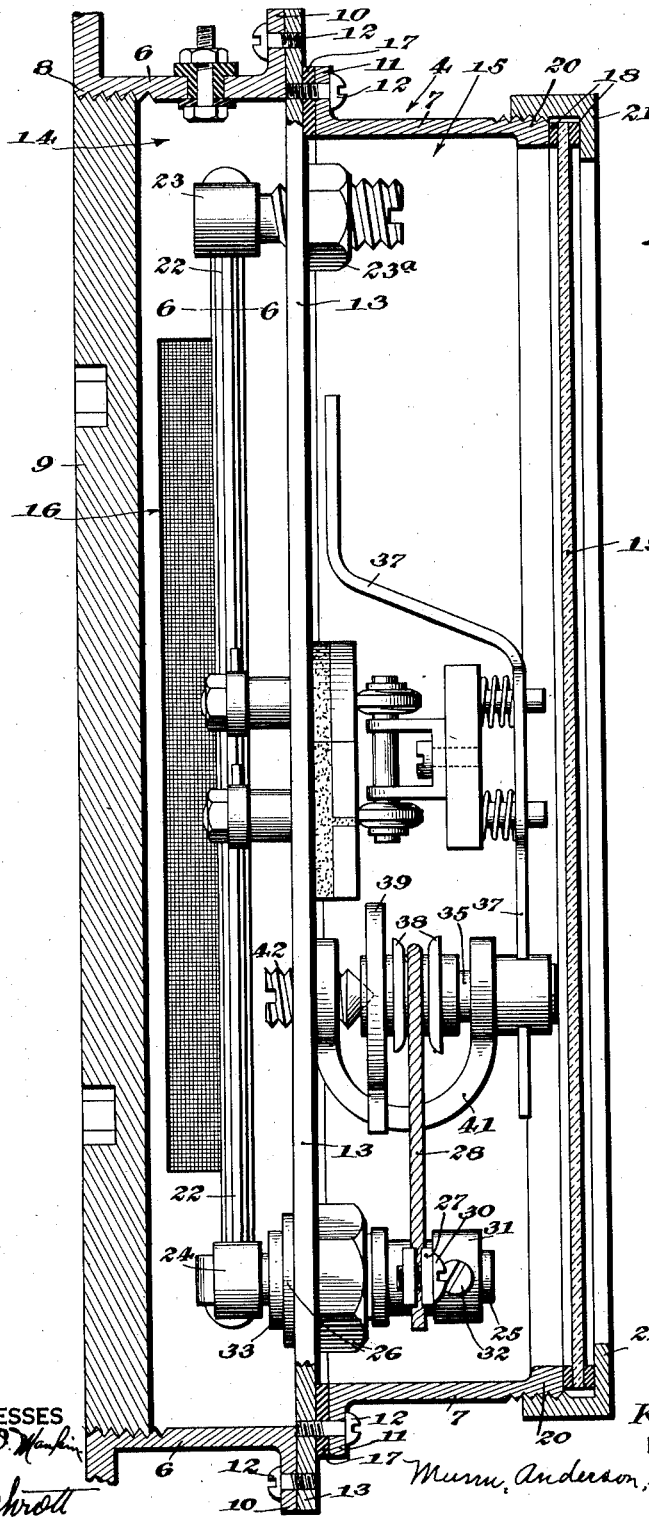

Patented Nov. 5, 1935

2,020,081

UNITED STATES PATENT OFFICE 2,020,081

HYGROMETER

Karl F. Schoew, Huntington, W. Va.

Original application August 31, 1932, Serial No. 631,261. Divided and this application April 5, 1934, Serial No. 719,230

4 Claims. (Cl. 73—24)

This invention relates to improvements in measuring instruments, hygroscopes, and the like, and its objects are as follows:—

First, to provide an absorption hygrometer including a simple lever system by means of which slight fluctuations in the moisture content of the absorption element and consequent change in the length thereof are magnified on an appropriately large graduated dial.

Second, to include a transmission cord in said lever system for the purposes of ready adaptation to the angular positions of the shafts with which it is connected and avoiding the use of a stiff interconnection such as gearing which would eventually become subject to lost motion.

Third, to encase said transmission cord (among other parts) in an air-tight enclosure so that it will not be affected by the outer atmosphere.

Fourth, to use the partition plate between the absorption element and the foregoing lever system as the common mount for these and all other working parts of the hygrometer so that the final assemblage of the instrument requires only the securement of the two cylindrical members to complete the casing.

In the drawings:—

Figure 1 is a partially sectional and elevational view of the improved hygrometer, the structure being shown as though viewing the instrument from the front and particularly illustrating the simple lever system hereinafter enlarged upon.

Figure 2 is a detail cross section taken on the line 2—2 of Figure 1, particularly illustrating that shaft of the foregoing lever system to which the absorption element and transmission cord are connected.

Figure 3 is a detail section taken on the line 3—3 of Figure 1, particularly illustrating the pointer shaft to which the transmission cord is also connected.

Figure 4 is a vertical section taken substantially on the line 4—4 of Figure 1, parts being shown in elevation.

Figure 5 is a detail perspective view of the clamp arm to which one end of the transmission cord is secured, this being an element of the lever system.

Figure 6 is a detail cross section taken on the line 6—6 of Figure 4 illustrating the stranded construction of the absorption element.

This application is a division of an application for Letters Patent for Hygrometer and electrical indicating system controlled thereby, filed by Karl F. Schoew August 31, 1932, Serial No. 631,261, and re-entitled "Hygrometer operated switch". The instant hygrometer is made with a particular view to a sensitive and accurate indication of the moisture conditions of the atmosphere in which it may be hung, whether that be in the workings of a mine, the outer air or in confined places such as factories, offices and the like.

The original adaptation of the hygrometer (see the parent case) was to the control of an electrical switch. While said switch is illustrated herein, there will be no more than a brief mentioning of it since its details are confined to the parent application. It is desired to state that the provision of an air tight compartment is as important to the lever system which ultimately works the switch as it is to the switch itself because, by excluding the outer atmosphere a factor which is likely to have a distributing effect on the accuracy of the instrument is eliminated as is presently made clear.

Refer to the drawings. The hygrometer generally indicated 4, comprises a casing of cylindrical shape (but not necessarily so) which is composed of cylindrical members 6, 7 (Fig. 4). The member 6 is internally threaded part way as at 8 to admit a plug 9 which is secured in place to form a back. Flanges 10, 11 on adjacent ends of the members 6, 7 (Fig. 4) are screwed down as at 12 or otherwise secured in common to a partition 13 which divides the casing into two compartments 14, 15.

The compartment 14 is open to the outer atmosphere by means of screened windows 16. The compartment 15 is made as air tight as possible so as to avoid affecting its contained mechanism a least amount, and for that purpose a rubber or other washer 17 is interposed between the flange 11 and partition 13. For the same reason washers 18 are used on each side of the cover glass 19 at the front of the hygrometer, said washers engaging opposite sides of the glass near the rim and being pressed against the enlarged end 20 when the bezel 21 is screwed home.

Situated in the compartment 14 so as to be exposed to air such as is present around the hygrometer is an absorption element 22 which has the property of lengthening when absorbing moisture and contracting when it dries.

The absorption element is stranded (Fig. 6). Here the illustration shows nine strands, but in practice the number may be more or less. It is this stranding of the absorption element which makes a large contribution to its sensitive absorption qualities. One end of the element is directly secured to an anchor 23 (Fig. 4). This anchor comprises an adjustable screw stud with means to which one end of the element is directly attached (Fig. 1). The stud is screwed through the partition 13 which thus provides its mounting. There is a lock nut 23ᵃ on the screw stud, and by loosening the lock nut and turning the screw stud a proper initial tension of the absorption element is obtained, in turn producing a proper initial reading on the graduated dial or scale.

The opposite end of the absorption element is secured to an arm 24 which is the first member of a simple lever system for translating the fluctuations of the absorption element into readable indicia, said system comprising the following parts, as well as incidental parts. A shaft 25 has the arm 24 secured to it at one of its ends (Fig. 2), one of the modes of securing being by threads. An appropriate bushing structure 26, fixedly secured to the partition 13, provides a bearing for the shaft. The shaft extends from the compartment 14 into the compartment 15.

It is obvious that the arm 24 is on that end of the shaft 25 projecting into the compartment 14. The opposite end of the shaft in the compartment 15 carries a second arm 27 with which a short transmission cord 28 is connected. Being a cord this is flexible by nature. The arms 24, 27 are diverse to each other, the assemblage 24, 25 and 27 constituting a turnable member of the lever system.

Although the cord 28 is flexible it will never sag. This is partly due to its confinement to the air tight compartment 15 from which a possibly heavily moisture-loaded external atmosphere is excluded. One end of the cord is clamped in the arm 27 which is made forked (Fig. 5) for the purpose. The cut 29 which produces the fork tapers toward the hub of the arm so that said end of the cord 28 can be wedged in to begin with. A screw 30 is then turned home to clamp the cord in place tightly.

A collar 31 is fitted onto the end of the shaft 25 to prevent end motion of the shaft 25. This collar is held by a set screw 32 (Figs. 1 and 4). The shaft 25 has an enlargement 33 adjacent to its threaded end (Fig. 2). This bears against the bushing structure, and it is between the enlargement 33 and the collar 31 that the shaft is kept in place.

The other end of the transmission cord 28 is suitably secured at 34 (Fig. 3) to the pointer shaft 35. The front end of this shaft is threaded at 36 to fixedly carry the pointer 37 which is attached by screwing its hub in place. The pointer moves when the shaft turns. The cord 28 is guided by flanges 38 (Figs. 3 and 4) which convert the medial portion of the shaft into a sheath. This is the end of the foregoing lever system and its details, and up to this point only counter-clockwise turning of the pointer 37 occurs upon contraction of the element 22 as by drying.

Clockwise turning of the pointer occurs by means of a spring 39 which is secured to the shaft 35 at one end as at 40 (Fig. 3), and at the other end to a part of the pointer standard 41 either by merely hooking over (Fig. 1) or by using some securing means. The spring 39 is on the order of a clock spring. Its unwinding tendency is toward the right thus tending to move the pointer 37 toward the right, or clockwise as already stated. When the absorption element 22 becomes increasingly moist it lengthens and permits clockwise movement of the pointer by virtue of the spring 39 keeping the slack out of the transmission cord 28. When the absorption element dries it contracts and causes counter-clockwise movement of the pointer 37, the pull transmitted by the cord 28 winding up the spring 39.

A stud 42 (Fig. 3) both secures the pointer standard 41 to the partition 13 and provides a pivot for the shaft 35. For that purpose the stud is pointed. The standard 41 is made in the form of a U. The stud 42 secures one arm of the U and the other arm completes the bearing for the shaft 35.

From what has been stated it will be understood that the partition plate 13 comprises the common mount for all of the working parts of the hygrometer. This is an outstanding advantage in manufacturing. The completion of the instrument only requires the addition of the cylindrical members 6, 7. These too are attached to the partition plate, and are not depended upon to carry any part of the mechanism to the hygrometer. A further purpose of the partition plate is that of a dial, and its front face is figured at 74 (Fig. 1) to that end.

The so-called figuring (or indicia) chiefly comprises radial graduations which are numbered in percentages from 100 to 0. Certain sets of these successively run through the ranges of "safe", "fairly safe", "dangerous" and "very dangerous". An inspection of the dial of the hygrometer will show the condition of the atmosphere affecting the absorption element 22.

The operation is readily understood. It will be remembered that the spring 39 tends to unwind and so turn the pointer 37 clockwise. The absorption element 22 and its lever system by which connection is made with the pointer 37 tend to prevent this tendency. When the absorption element lengthens by virtue of the absorption of moisture, the unwinding tendency is permitted and the pointer 37 moves clockwise. When the element 22 dries it contracts and so turns the pointer 37 counter-clockwise against the tension of the spring.

It is to be observed that the points of connection of the element 22 and cord 28 with the respective arms 24 and 27 are an appreciable distance from the axial center of the shaft 25 (Fig. 1). Any fluctuation of the element 22 as regards its length is repeated at the foregoing point of connection of the cord 28. Although the other point of connection of the cord to the shaft 35 is a little closer to the axial center of that shaft than is the first point of connection to the axial center of 25, yet the relatively great length of the pointer 37 will magnify the transmitted motion to such an extent on the dial as to give a faithful reading of every atmospheric change to which the instrument is subjected.

It is to be observed, further, that the cord 28, solely by virtue of its flexibility, is readily adaptable to every angular change in position of the shafts 25, 35. This cord is constantly held under a degree of tension since it occurs between the absorption element 22 and the spring 39, so that there is never any slack in it which is likely to produce a false reading. The occurrence of a backlash is totally eliminated. The confinement of the transmission cord to the air tight compartment 15 defends it against the lengthening and shortening influences of the outer atmosphere to which the element 22 is purposely and necessarily subjected.

I claim:—

1. A hygrometer comprising an absorption element, a mount and means by which one end of the element is clamped to the mount, a pointer and a shaft by which the pointer is carried, a standard providing a part bearing for the shaft and means for both completing the shaft bearing and securing the standard to the mount, another shaft and means for supporting it on the mount, said shaft having diverse arms of which one is connected to the remaining end of the element, and a cord connected between the other arm and the first shaft, and a spring to hold one shaft under tension to keep the slack out of the cord.

2. A hygrometer comprising an absorption element, a mount and means to anchor one end of the element on the mount, a pointer and a shaft carrying the pointer, said shaft having flanges constituting a sheath, a spring having one end connected with the shaft, a standard in which the shaft has part bearing, means which both completes the bearing for the shaft and secures the standard to the mount, said standard having the other end of the spring attached thereto, a second shaft and means by which it has bearing on the mount, diverse arms on said shaft with one of which the remaining end of the element is connected, and a cord connected to the other arm and to the sheath.

3. A hygrometer comprising two members which are the chief parts of a casing, a partition plate and means by which said members are affixed thereto, one of the members having constant access to the atmosphere, means by which the other member is made air tight to provide an air tight compartment which contains the following structure, a pointer, a pair of shafts, one of them carrying the pointer, a flexible cord connecting the shafts, separate means by which the shafts are mounted solely on the partition plate, one of the shafts projecting through the plate; an absorption element in the air-accessible member having one end connected with said projection, and means by which the other end of the element is anchored on the partition plate.

4. A hygrometer comprising an air tight compartment and means by which it is kept air tight, and an air-accessible compartment, a pointer in the air tight compartment, means for actuating the pointer including a shaft projecting from one compartment into the other, there being sealing means by which the shaft is turnably carried, said pointer actuating means including a cord which is situated in the air tight compartment so as not to be subject to the outer atmosphere, an absorption element in the air-accessible compartment having one end connected to said shaft, and means to anchor the other end of said element.

KARL F. SCHOEW.